United States Patent
Bobykin et al.

(10) Patent No.: US 9,286,273 B1
(45) Date of Patent: Mar. 15, 2016

(54) METHOD AND SYSTEM FOR IMPLEMENTING A WEBSITE BUILDER

(71) Applicant: Parallels IP Holdings GmbH, Schaffhausen (CH)

(72) Inventors: Anton Bobykin, Novosibirsk (RU); Andrey Kugayevsky, Novosibirsk (RU); Sergey Oleinikov, Novosibirsk (RU); Yuriy Tsybrovskyy, Seattle, WA (US); Sergey Lystzev, Novosibirsk (RU); Alexander G. Tormasov, Moscow (RU); Stanislav S. Protassov, Moscow (RU); Serguei M. Beloussov, Singapore (SG)

(73) Assignee: Parallels IP Holding GmbH, Schaffhausen (CH)

( * ) Notice: Subject to any disclaimer, the term of this patent is extended or adjusted under 35 U.S.C. 154(b) by 311 days.

(21) Appl. No.: 13/792,604

(22) Filed: Mar. 11, 2013

(51) Int. Cl.
*G06F 17/00* (2006.01)
*G06F 17/22* (2006.01)
*G06F 17/30* (2006.01)

(52) U.S. Cl.
CPC ........ *G06F 17/2247* (2013.01); *G06F 17/3089* (2013.01)

(58) Field of Classification Search
CPC . G06F 17/2247; G06F 17/24; G06F 17/3089; G06F 17/248
USPC ........................................................ 715/234
See application file for complete search history.

(56) References Cited

U.S. PATENT DOCUMENTS

| | | | | |
|---|---|---|---|---|
| 6,263,352 B1 * | 7/2001 | Cohen | ..................... | G06F 17/21 709/203 |
| 6,601,057 B1 * | 7/2003 | Underwood | ............ | G06F 17/21 707/770 |
| 7,725,565 B2 * | 5/2010 | Li | ........................ | G06Q 10/067 709/219 |
| 8,595,691 B2 * | 11/2013 | Ellen | ..................... | G06Q 30/02 717/106 |
| 2001/0056460 A1 * | 12/2001 | Sahota et al. | ................. | 709/201 |
| 2002/0039114 A1 * | 4/2002 | Feathers et al. | ............... | 345/738 |
| 2002/0059339 A1 * | 5/2002 | McCormick et al. | ...... | 707/500.1 |
| 2002/0099605 A1 * | 7/2002 | Weitzman et al. | .............. | 705/14 |
| 2002/0136279 A1 * | 9/2002 | Al-Kazily et al. | ............ | 375/150 |
| 2004/0123244 A1 * | 6/2004 | Campbell | ............. | G06F 17/243 715/253 |
| 2005/0246627 A1 * | 11/2005 | Sayed | ................... | G06F 17/248 715/234 |

(Continued)

*Primary Examiner* — Laurie Ries
(74) *Attorney, Agent, or Firm* — Bardmesser Law Group (57) ABSTRACT

A method and system for a site builder. The site builder is an application designed to create and edit websites for hosting providers, resellers and end users. Built with hosting in mind, the proposed site builder allows providers to easily offer site building capabilities to their customers. The easy five-step wizard interface provides for an effortless way for customers to create, modify and update their own websites without any technical skills or HTML know-how. The site builder application for LINUX/Unix or WINDOWS also comes with a comprehensive administration panel that allows providers to quickly and easily tailor the application to their needs.

12 Claims, 9 Drawing Sheets

(56) References Cited

U.S. PATENT DOCUMENTS

| Publication No. | Date | Inventor | Classification/Page |
|---|---|---|---|
| 2005/0278644 A1* | 12/2005 | Greaves et al. | 715/760 |
| 2006/0004703 A1* | 1/2006 | Spivack | G06F 17/3089 |
| 2006/0173985 A1* | 8/2006 | Moore | G06F 17/3089 709/223 |
| 2006/0248442 A1* | 11/2006 | Rosenstein | G06F 17/24 715/205 |
| 2006/0277205 A1* | 12/2006 | Song | G06N 5/02 |
| 2007/0208751 A1* | 9/2007 | Cowan | G06Q 30/02 |
| 2008/0072139 A1* | 3/2008 | Salinas | G06F 17/30905 715/238 |
| 2008/0120538 A1* | 5/2008 | Kurz | G06F 17/30905 715/255 |
| 2008/0172608 A1* | 7/2008 | Patrawala | H04L 67/02 715/255 |
| 2008/0189303 A1* | 8/2008 | Bush | G06F 17/30528 |
| 2008/0215967 A1* | 9/2008 | Abrams | G06F 17/3089 715/255 |
| 2008/0215985 A1* | 9/2008 | Batchelder | G06F 17/248 715/731 |
| 2008/0294981 A1* | 11/2008 | Balzano | G06F 17/21 715/256 |
| 2008/0313260 A1* | 12/2008 | Sweet | G06F 17/3089 709/201 |
| 2009/0028431 A1* | 1/2009 | Sasaki et al. | 382/167 |
| 2009/0222416 A1* | 9/2009 | Tymoshenko | G06F 17/30887 |
| 2010/0017703 A1* | 1/2010 | Glickman, Jr. | G06F 17/3089 715/234 |
| 2010/0070851 A1* | 3/2010 | Chen et al. | 715/236 |
| 2010/0174603 A1* | 7/2010 | Hughes et al. | 705/14.42 |
| 2010/0174974 A1* | 7/2010 | Brisebois | G06F 17/243 715/223 |
| 2010/0269036 A1* | 10/2010 | Berger et al. | 715/243 |
| 2011/0047529 A1* | 2/2011 | Randimbivololona | 717/124 |
| 2012/0054609 A1* | 3/2012 | Sher Sever et al. | 715/709 |
| 2012/0197718 A1* | 8/2012 | Martchenko | G06Q 30/0255 705/14.53 |
| 2012/0204104 A1* | 8/2012 | Walsh | 715/273 |
| 2013/0198609 A1* | 8/2013 | Mokhtarzada | G06F 3/048 715/234 |
| 2013/0204746 A1* | 8/2013 | Lee | G06Q 10/06 705/26.62 |
| 2013/0260353 A1* | 10/2013 | Mayumi et al. | 434/350 |
| 2013/0283194 A1* | 10/2013 | Kopp | G06F 3/0481 715/764 |
| 2014/0006913 A1* | 1/2014 | Gopalakrishna | G06F 17/30896 715/200 |
| 2014/0046980 A1* | 2/2014 | Kleinschmidt et al. | 707/793 |
| 2014/0075283 A1* | 3/2014 | Coursol | G06F 17/3089 715/234 |
| 2014/0222553 A1* | 8/2014 | Bowman | G06Q 30/0276 705/14.45 |

* cited by examiner

METHOD AND SYSTEM FOR IMPLEMENTING A WEBSITE BUILDER

BACKGROUND OF THE INVENTION

1. Field of the Invention

The present invention relates to automated web site creation, and more particularly, to a web site builder capable of creating web sites for users who have no web development skills.

2. Description of the Related Art

Currently, there are a number of conventional methods that relate to website building. The latest breed of website builders is Wix, Yola and WebsPlanet. Wix and Yola are more successful than other site builders due to ease of "getting on board". These site builders provide for attractive-looking sites created in minutes that satisfy many owner's needs. The above site builders use a pre-created content for specific types of sites. The pre-created content is sufficient for professional designers to create low-cost client sites.

Wix and Yola deal well with search engine features. The site builders can be used in conjunction with other services, such as blogs (WordPress), marketplaces (Etsy, Craigslist and eBay) or social networks (Facebook/MySpace). The site builders provide for an unobtrusive up-sell of premium features.

However, while using Wix and Yola, one still needs to have a good taste and some basic understanding of good design principles. Otherwise, the created site falls into one of the two categories:

a cookie-cutter site—based on a standard template with very little edits;

a "messed up" site—overdone by too many features and widgets, unmatched colors, etc.

It is not surprising that both Wix and Yola cultivate communities of people, who can design a site for another user. To keep paying customers and up-sell them successfully, a straight-from-template site built by an absolute "newbie" should work and make sense for the owner to keep. For the majority of users, that means that the site must be discoverable and visible in search engines.

Typically, Flash-based sites have problems with search engine optimizations (SEO), but Wix addresses that problem by putting all text content into special one-page HTML version that the search engine bot analyzes. It tries hard to overcome technology limitation, but this approach is not completely bug-free, sometimes "lorem ipsum" text from templates gets mixed, and other bugs have been found as well.

Both solutions can generate sitemap, keywords and descriptions automatically. One can also edit them manually, but even default settings are acceptable. One can monitor and improve site performance by using Wix/Yola tools or easily connect to Google Webmaster/Site Analytics and other solutions.

Special attention is required in case of upgrading free site to its own domain—if Google will see both sites (sub-domain version remains available), then it might wrongly believe that sub-domain version is the original and direct traffic there. The solution is to use a rel-canonical tag to direct traffic to the right version, as Wix does.

However, the way the Wix site is built, there is no way to reference content other than on the home page (i.e., it has no deep links). In addition, while Google has limited support for flash content indexing, it does not work when flash is loaded from JavaScript, like Wix does, so whatever enhancements Google might do with regard to flash content indexing will not do any good for Wix users. Of course, current flash situation makes these enhancements unlikely.

Accordingly, there is a need in the art for an effective and efficient method for site building that does not require developer or designer input and that overcomes the deficiencies of the existing site builders.

SUMMARY OF THE INVENTION

The present invention relates to automated web site creation, and more particularly, to a site builder that substantially obviates one or more of the disadvantages of the related art.

In one aspect, there is provided a method and system for a web site builder. The web site builder is an application designed to create and edit websites for hosting providers, resellers and end users. Built with hosting in mind, the proposed site builder allows providers to easily offer site building capabilities to their customers. The easy five-step wizard interface provides for an effortless way for customers to create, modify and update their own websites without any technical skills or HTML know-how.

The site builder application for Linux/Unix or Windows also comes with a comprehensive administration panel that allows providers to quickly and easily tailor the application to their needs. The site builder can be installed either as a stand-alone system with the ability to publish to any server or group of servers via FTP or as an integrated add-on with the ability for domain owners to access the site builder to design, build and publish sites from within a special interface.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF EMBODIMENTS OF THE INVENTION

Reference will now be made in detail to the embodiments of the present invention, examples of which are illustrated in the accompanying drawings.

A method, system and computer program product for an efficient site builder is provided. The method, in accordance with the exemplary embodiment, provides for an application designed to create and edit websites for hosting providers, resellers and end users. Built with hosting in mind, the proposed site builder allows providers to easily offer site building capabilities to their customers. The easy five-step wizard interface provides for an effortless way for customers to create, modify and update their own websites without any technical skills or HTML know-how.

The site builder application for Linux/Unix or Windows (or other operating systems) also can include with a comprehensive administration panel that allows providers to quickly and easily tailor the application to their needs. The site builder can be installed either as a stand-alone system with the ability to publish to any server or group of servers via FTP or as an integrated add-on with the ability for domain owners to access the site builder to design, build and publish sites from within a special interface.

According to an exemplary embodiment, the site builder provides a number of advantages:

Easy-to-Use Web Interface—5 step point and click wizard that includes design, page structure, content editor, etc.;

Advanced Templates and Powerful WYSIWYG Editor—numerous high quality templates, WYSIWYG editor, etc.;

Designed for Differentiation—an ability to select customizable skins to change site builder's design;

Open Architecture—an ability to create and modify templates, skins, page sets, languages packs, etc.;

Professional Support—high quality technical support along with regular updates.

According to the exemplary embodiment, a user can quickly create and publish websites in five simple steps using a five-step wizard:

The end users can select the type of the site he would like to create;

The user can select from hundreds of quality templates using a special improved template selection interface. The user can customize the site design by selecting colors, headers, and logos;

The end users can define the site structure and select various page sets;

The end users can use drag and drop capabilities for modules and pages (so the users can define their site hierarchy);

During the edit step, the end users can create content using an improved WYSYWIG editor. In addition, end users have the capability to drag and drop modules into the page content directly.

The end users can instantaneously publish their site to a target location using admin-specified or custom FTP settings. According to the exemplary embodiment, the site builder uses flexible modules that make the site builder even more powerful and flexible. The modules are: a blog, an image gallery, a guestbook, an eShop, a SitePal, a forum module, a feedback module, a registration module, an RSS reader, voting module, a script, an area map, a file download, a site map, an external page, and a flash intro.

A site builder, in accordance with the exemplary embodiment, is a browser-based web site creation and editing application that provides ease of use and value. The software is not only easy to use but offers hosting providers an effortless way to increase revenue. According to the exemplary embodiment, the site builder is an ideal tool for converting the owner's site traffic into a new customer base.

According to the exemplary embodiment, the site builder operates as a cloud. The site builder is integrated into hosting and is accessible to all users, who do not have any design and web programming skills. The site builder can also be used by professionals due to a diverse functionality, simplicity in use, an open architecture and a quality of created web sites. Most importantly, the web site creation takes very little time.

Figure 1:
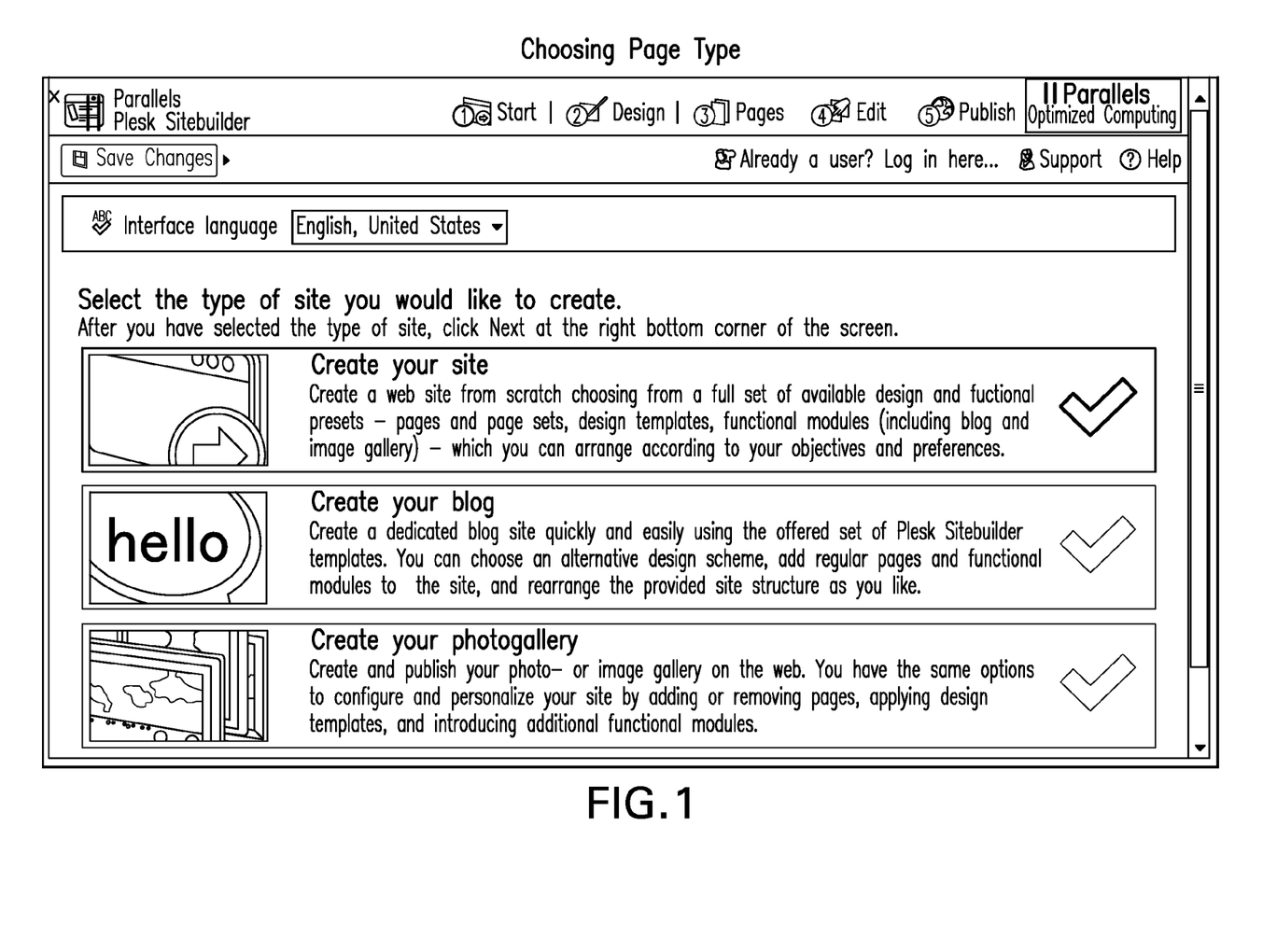
FIG. 1 illustrates a screen shot of a site type selection site builder wizard, in accordance with the exemplary embodiment.
Figure 2:
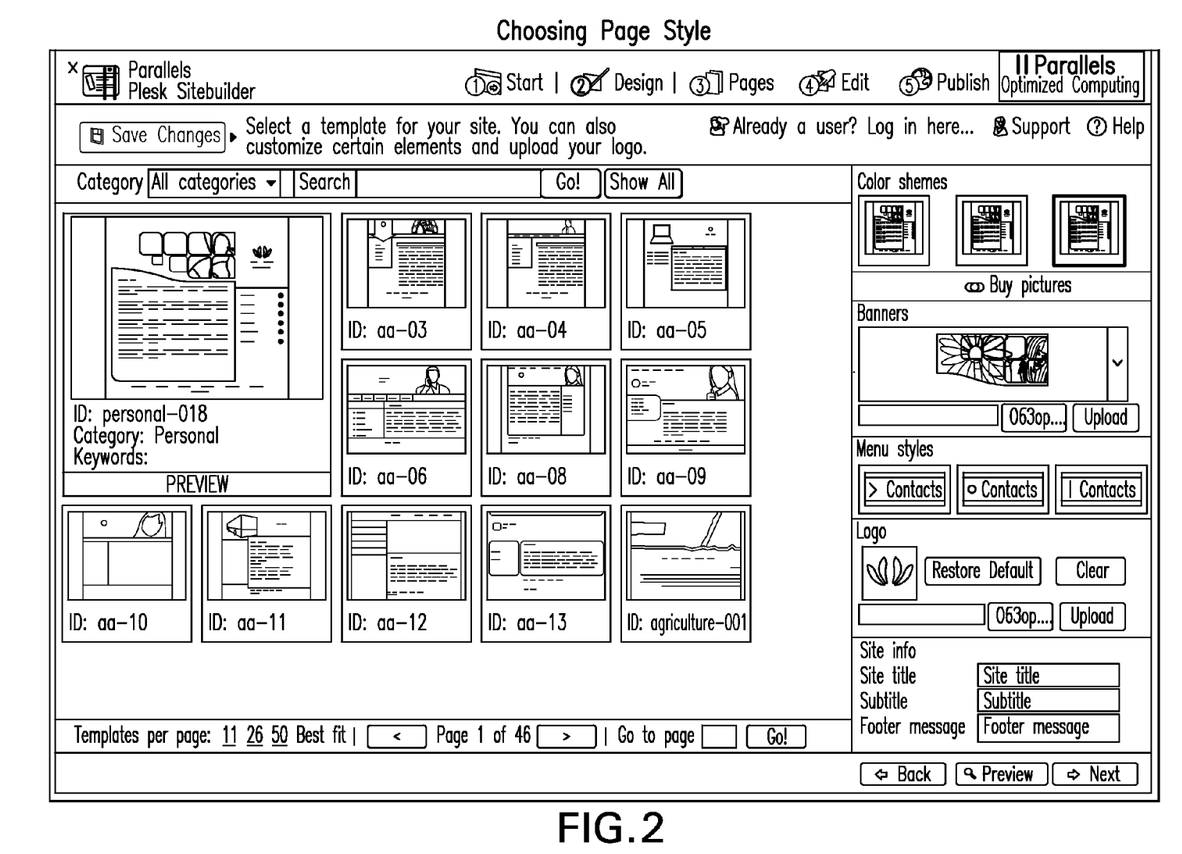
FIG. 2 illustrates creation of a site design by choosing a page style provided by a site builder wizard, in accordance with the exemplary embodiment.

According to the exemplary embodiment, a user selects a type of a site to be created. A screen shot of a site type selection wizard is displayed in FIG. 1. In this example, a user is given a choice of creating a site from scratch, creating a blog or creating a photo gallery. Once the user selects the site type, the user can create a design by choosing a page style depicted in FIG. 2. The screen shot of the wizard depicted in FIG. 2 provides a user with a number of templates that can be implemented using different color schemes (see right side of the screen). The user can also choose banners, menus, logos as well as set a site title and a footer message. Then, the user can preview the site (see upper left portion of the screen shot).

Figure 3:
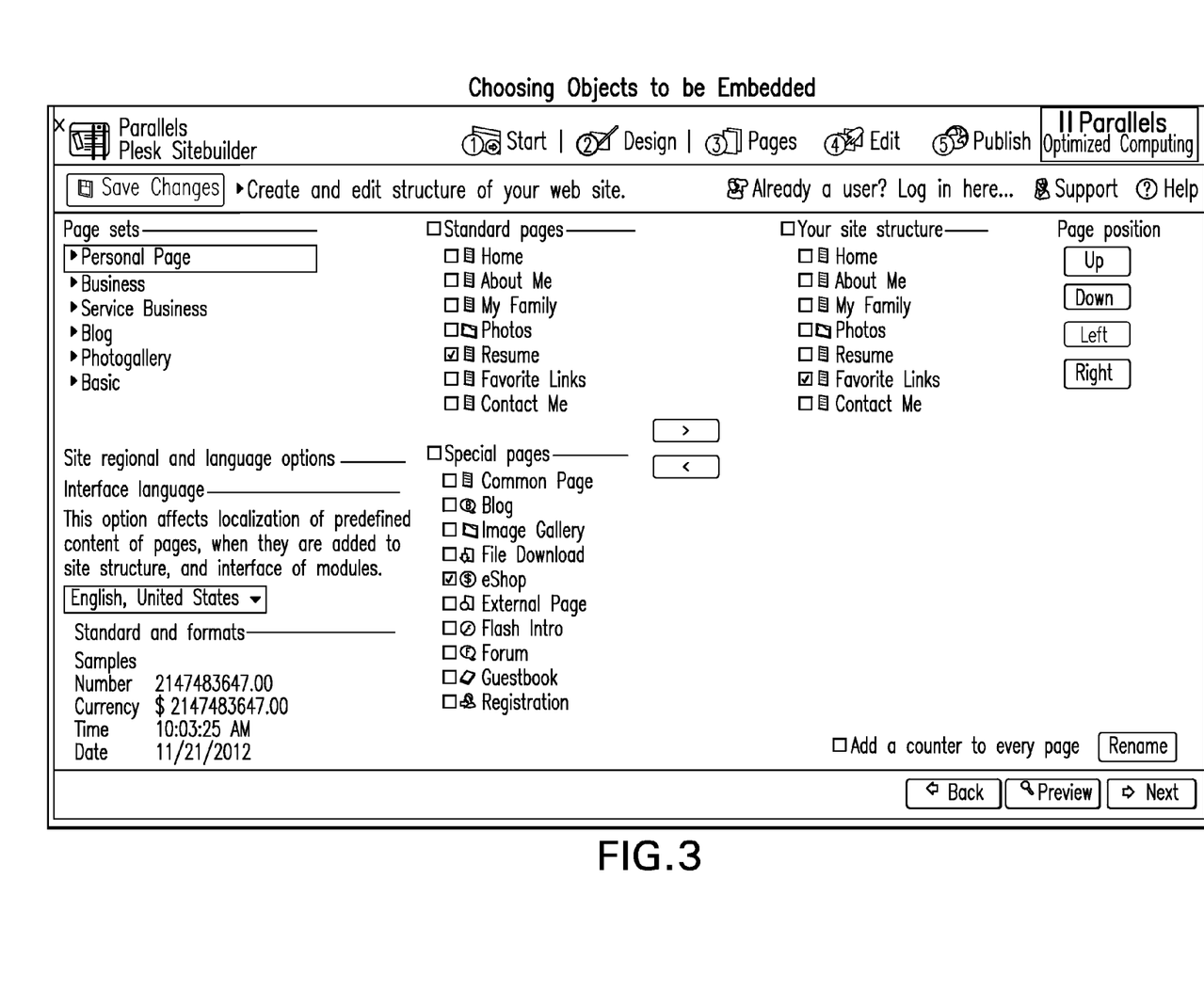
FIG. 3 illustrates site builder wizard screen shots for selecting objects to be embedded into the created web site.
Figure 4:
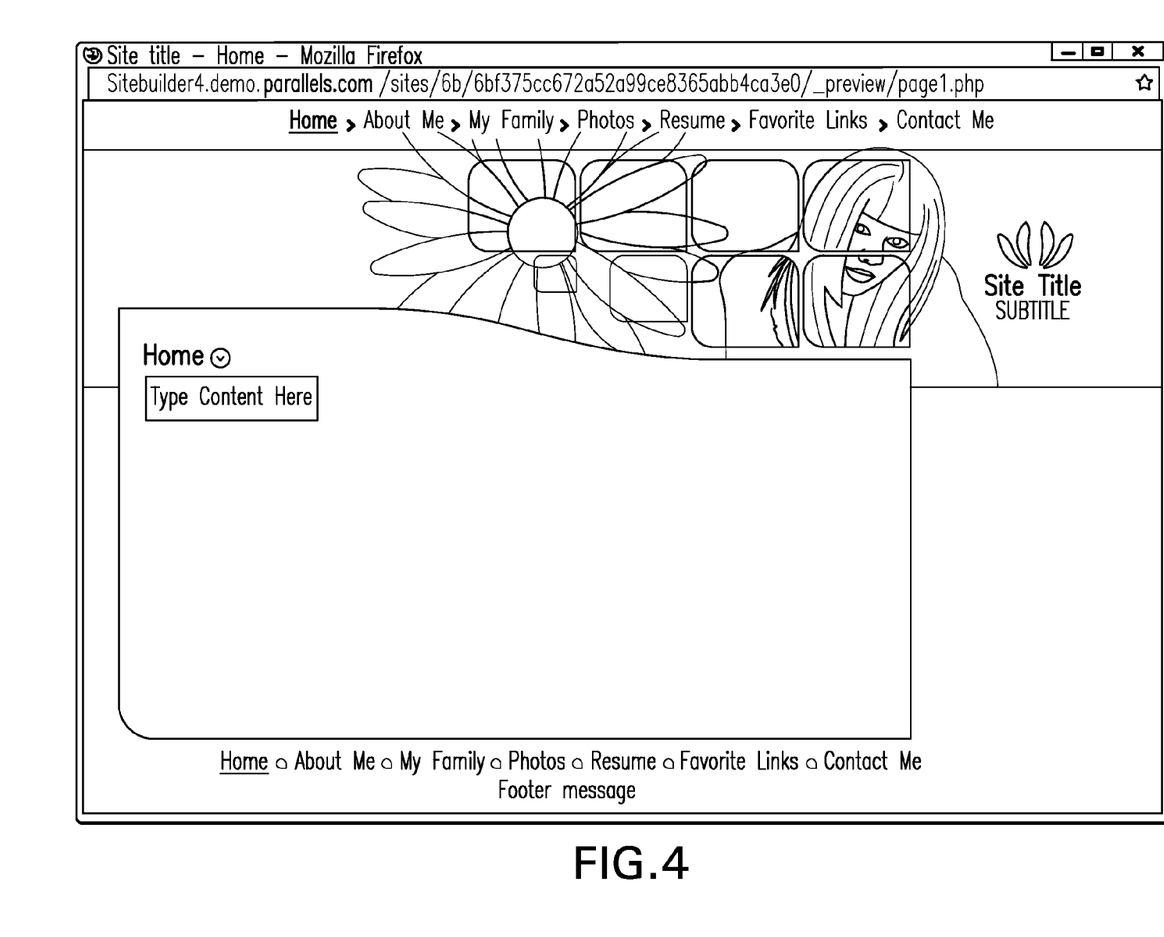
FIG. 4 illustrates a preview of a full size web page provided by the site builder, in accordance with the exemplary embodiment.
Figure 5:
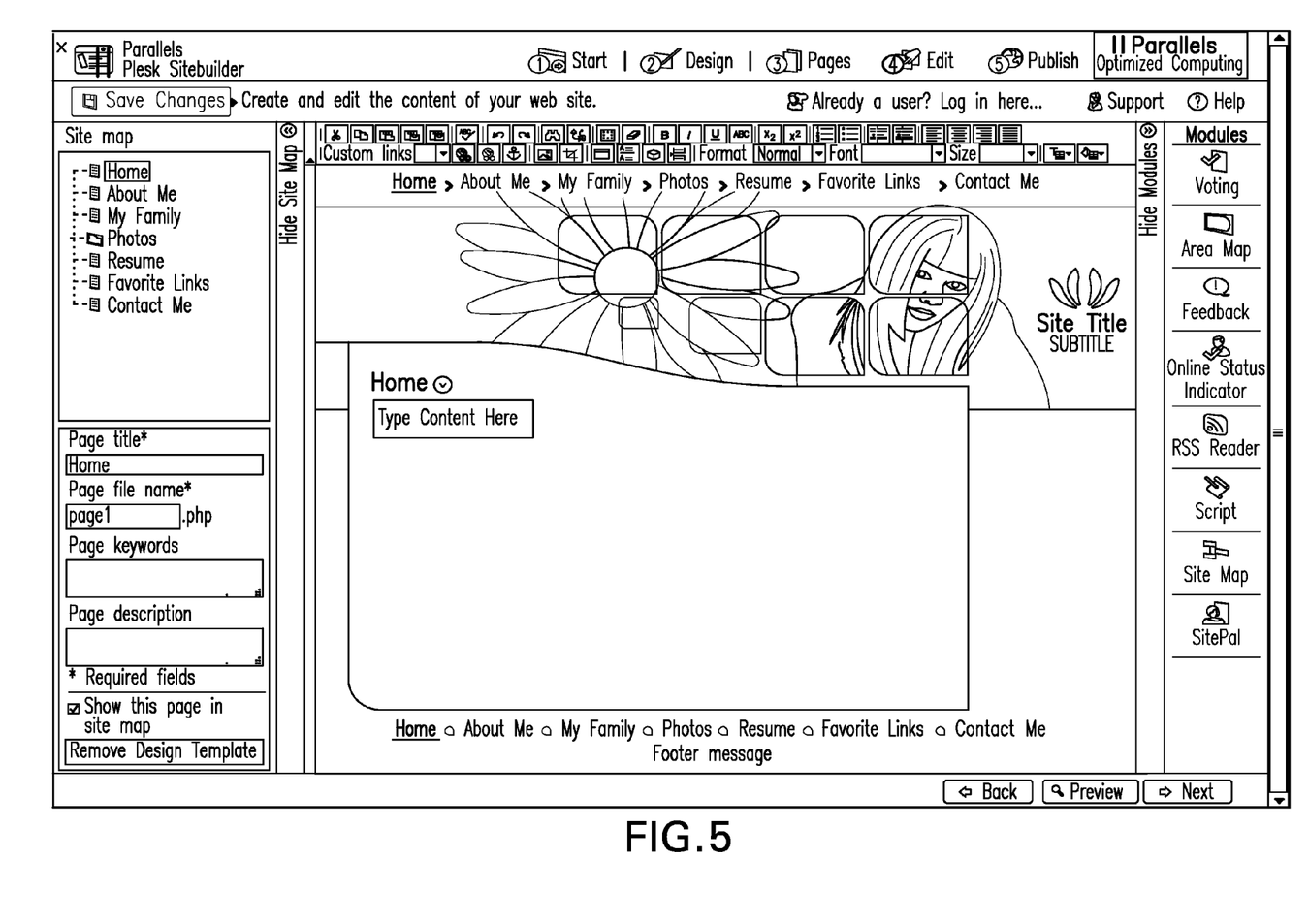
FIG. 5 illustrates a site builder wizard allowing a user to create content of the site template and fill it with texts and graphics.

FIG. 3 illustrates site builder wizard screen shots for selecting objects to be embedded into the created web site. The user has a number of choices in terms of the objects and features that he can select for the new site. The user is given a choice of position of the object on his site. Subsequently, the user can preview a full size web page as shown in FIG. 4. Then, the user can create the content of the site template and fill it with texts and graphics—see FIG. 5. The user can edit the existing template features and graphics.

In other words, a process of web site creation can be divided into five steps:
1. Select a type of the web site;
2. Create a design of the site;
3. Chose the site structure;
4. Fill the site (pages) with text and graphics;
5. Publish the site in the Internet.

Figure 6:
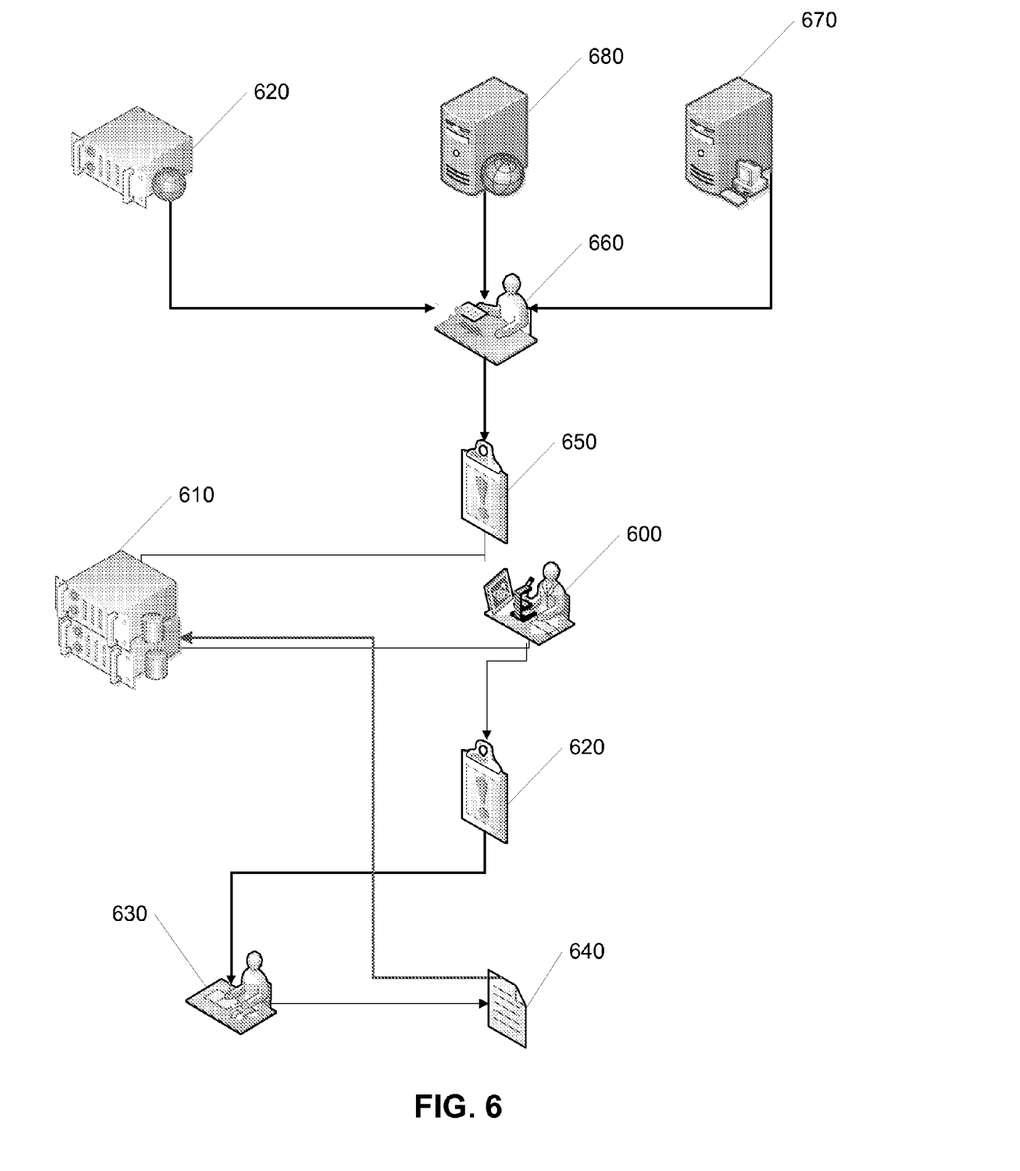
FIG. 6 illustrates a workflow used for creation of a web site by a site builder, in accordance with the exemplary embodiment

FIG. 6 illustrates a workflow used for creation of a web site by a site builder in accordance with the exemplary embodiment. A user 600 creates a site using the site builder wizards depicted in FIGS. 1-5. The user site builder application acquires site templates from a content server 610. If a desired template is not found in a template library 620 located on the server 610, desired template parameters and graphics are prepared by a designer 630 in a form of a new template (s) 640. The new template 640 is provided to the content server 610 and is made available to the user 600 via the template library.

The user 600 creates a site 650 and sends it to a specialist 660 for a usability assessment using the Internet 680, local servers 670 and content servers 690. The specialist 660 makes a decision as to whether to publish the site or not. If the site is not published, then normally the site will be modified, and a new version will be sent. The process rolls back to repeat the scenario, until the site is in a condition to be published.

Figure 7:
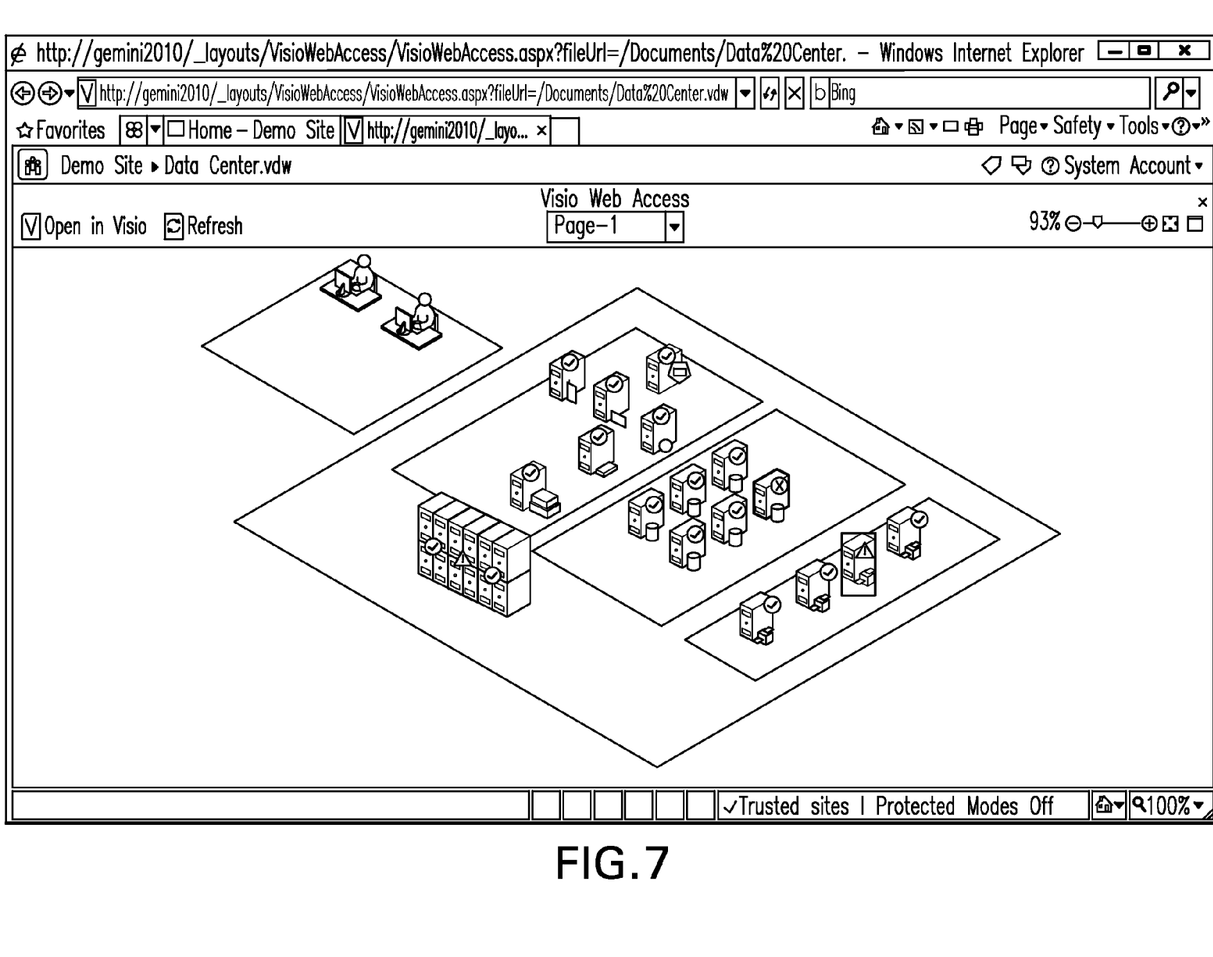
FIG. 7 illustrates that professional designers prepare site templates for a site builder data center.

FIG. 7 illustrates that professional designers prepare site templates for a site builder data center. The professional designers can check a new site for usability prior to publication. In one embodiment, the users of the site builder and the site users generate a rating (e.g., on a 5 or 10 point scale) of the professional designers and their work, who created the site templates. The system keeps track of the ratings on a centralized server, and can make them visible to other users, who can in turn use them to select the designer and/or the template.

According to the exemplary embodiment, a user can select a design and functionality of the site using site categories, such as, for example services, real estate, construction, retail store, entertainment, events, health, sports, education, hobbies, personal site, etc. Each category has over sixty available templates for the user to choose from. Alternatively, a user can decide to not select a category and to use a common template.

Subsequently, the user selects a design. The site builder provides hundreds of the design choices. The user can select color scheme, text styles, as well as other custom design parameters.

The user can generate a site structure by selecting ready-to-use modules including, graphics, texts, video, menus, scripts, advertising blocks, search blocks, navigation tools, contact form, information sharing block and etc.

According to the exemplary embodiment, the user can fill the web page with the text and graphics simply by using the mouse and an editor compliant with WYSIWYG HTML editing principles. Desired textual and graphical data can be, advantageously, placed into the web page in a matter of minutes. Then, the user can publish the site by simply clicking on a "publish" button. Note that the created site can be search-optimized by Google web master tools.

According to one exemplary embodiment, the site builder provides designed templates, and the user selects them based on a site topic and content. The system uses keywords and automatically generates the templates. In one embodiment, each set of the keywords provides a basic color scheme. Additional properties are provided by a color scheme shift vector. An image can be automatically selected, based on the keywords, that most closely matches the topic of the site. Similarly, color scheme can selected, e.g., pink color scheme for cosmetics, green for legal-related sites, and so on, using the shift vector to shift the colors, either for the whole site or on an element by element basis. Note that a large number of keywords and their weight coefficients can produce a nearly infinite number of designs.

In one embodiment, a set of keywords provides a color topic or a graphic topic. Another set of keywords provides a set of the page elements (or positioning on the pages). A plurality of templates can be used instead of the topics. A cloud of tags (such as keywords, or derivative words based on the keywords) are created and, if the color scheme changes, a set of graphics changes appropriately. The keywords can be changed dynamically, by the user, in a graphical format, which will result in changes in the site banner, and other site parameters.

According to the exemplary embodiment, each site topic generates a semantic cloud of keywords (and/or words obtained by parsing the content of the site), which can be used to modify site content. The keywords are used as image tags. For example, a topic "car wash" receives images and/or banners with the tags from a semantic cloud car wash. Optionally, the images (selected from a relevant set of images) can be provided in a random manner. Additionally, a color scheme is randomly generated for the car wash banner. In other words, unlike the conventional site builders, where if ten users select a topic "real estate," all ten will receive the same site, in the exemplary embodiment, ten users will get ten different sites.

Figure 9:
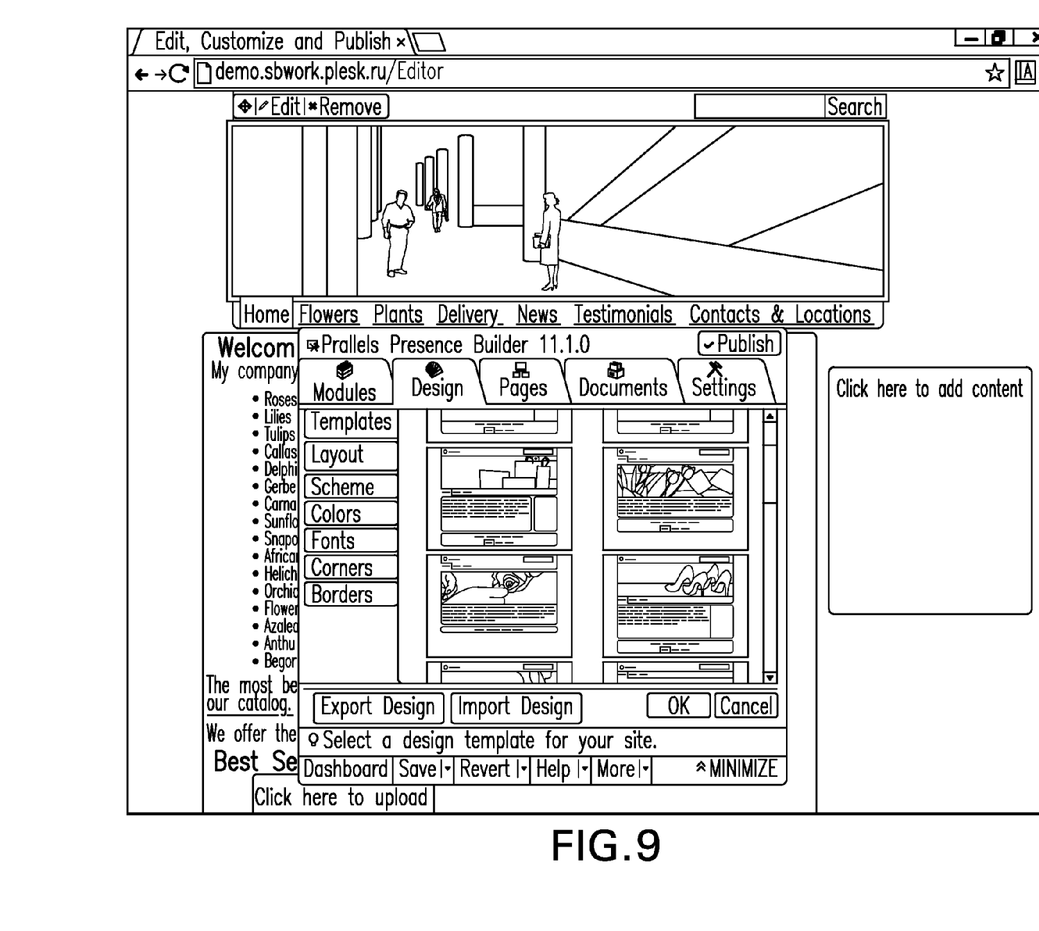
FIG. 9 illustrates the use of scrollbars to switch between the various designs.

Once a design or a set of designs is selected, scrollbars can be used to switch between the various designs, various properties based on which the site is selected (e.g., target audience age, gender, target audience income, and so on), see FIG. 9. The scrollbars can be used to move from most relevant to less relevant options.

With third party solution support, if a language of the website is changed by the user, the change in the code is transmitted to all the plug-ins and relevant third party code.

According to the exemplary embodiment, the site builder includes an emulator for testing the user sites on different platforms. For example, a mobile device can be used for testing a web site. The emulator can test the site by emulating typical user actions or it can provide a user with an opportunity to test his site on a mobile device, for example.

The site builder can be implemented as a separate application. Alternatively, the site builder can be integrated into a server control panel where user data is located. According to the exemplary embodiment, a web site owner can add to his site different functionality such as, for example: insert videos from YouTube, Vimeo, MySpace or Dailymotion.

The owner can insert images from Picasa or similar, and can create a web store using ECWID compliant-technologies to security standard PCI. The owner can also add comment capability using Disqus service. The owner can place social network buttons (for over than 300 networks) including Facebook, Twitter, LinkedIn, etc.

The owner can set a default search system and add context advertisement support such as Google AdSense. Note that all functionality can be added to the site without having to write any HTML scripts. Also, the site builder, in accordance to the exemplary embodiment, can create a site in different languages selected by a user.

According to the exemplary embodiment, a site builder is implemented as a cloud service integrated into a host. Thus, the site builder is accessible to all cloud users, who have no knowledge of web design and programming.

As a further embodiment, a control panel module can be added, which can write to a twitter-type feed about system state and notify about the system reaching any critical states from the health monitor. The module can also receive commands from an administrator and execute them on the server through a twitter feed.

The health monitor can set up threshold values that trigger events. For example, use of 90% of the allocated memory or certain swap characteristics can trigger a notification to the administrator through push notifications.

Optionally, the health monitor can notify an administrator through a mobile application on his mobile device.

Those skilled in the art will appreciate that the proposed method and system provide for an efficient and effective site builder, which can built the sites without any input from the designers or developers.

Figure 8:
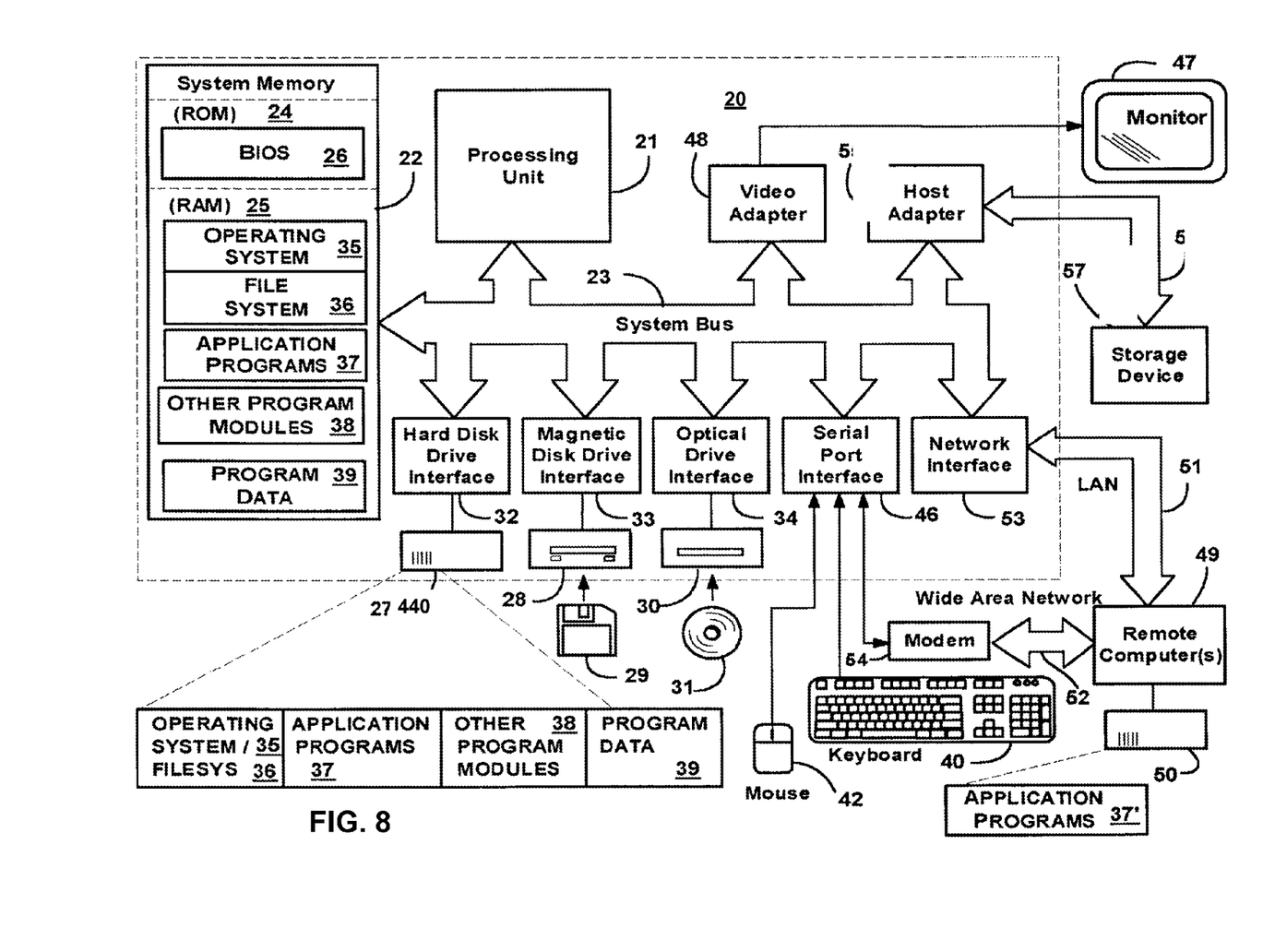
FIG. 8 illustrates a schematic diagram of an exemplary computer or server that can be used in the invention.

With reference to FIG. 8, an exemplary system for implementing the invention includes a general purpose computing device in the form of a personal computer 20 or server or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25.

A basic input/output system 26 (BIOS), containing the basic routines that help to transfer information between elements within the computer 20, such as during start-up, is stored in ROM 24. The personal computer 20 may further include a hard disk drive for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably WINDOWS™ 2000). The computer 20 includes a file system 36 associated with or included within the operating system 35, such as the WINDOWS NT™ File System (NTFS), one or more application programs 37, other program modules 38 and program data 39. A user may enter commands and information into the personal computer 20 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48.

In addition to the monitor 47, personal computers typically include other peripheral output devices (not shown), such as speakers and printers. A data storage device, such as a hard disk drive, a magnetic tape, or other type of storage device is also connected to the system bus 23 via an interface, such as a host adapter via a connection interface, such as Integrated Drive Electronics (IDE), Advanced Technology Attachment (ATA), Ultra ATA, Small Computer System Interface (SCSI), SATA, Serial SCSI and the like.

The computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the computer 20.

The computer 20 may further include a memory storage device 50. The logical connections include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46.

In a networked environment, program modules depicted relative to the personal computer 20, or portions thereof, may be stored in the remote memory storage device. It will be appreciated that the network connections shown are exemplary and other means of establishing a communications link between the computers may be used.

Having thus described the different embodiments of a system and method, it should be apparent to those skilled in the art that certain advantages of the described method and apparatus have been achieved. In particular, it should be appreciated by those skilled in the art that the proposed method provides for an efficient site builder for creating web sites, which does not require developers' and designers' input.

It should also be appreciated that various modifications, adaptations, and alternative embodiments thereof may be made within the scope and spirit of the present invention. The invention is further defined by the following claims.

What is claimed is:

1. A computer-implemented method for automated generation of web sites, the method comprising:
   (a) generating a plurality of web page templates and storing them in a template library on a content server;
   (b) establishing a network connection between the content server and a client; launching a site builder application on a client, the site builder application comprising a plurality of site builder wizards configured to receive and process site content data;
   (c) acquiring the web page templates from the template library and rendering them to a user via a first site builder wizard;
   (d) rendering to the user a web page design choices via a second site builder wizard; providing a third site builder wizard to a user for selecting a web page structure; presenting a user with a wizard for filling in a web page text and graphics; generating a preview of the web page and rendering it to the user;
   (e) sending the web page to a specialist for a usability assessment; and
   (f) publishing the web page upon completion of the usability assessment, wherein:
   the templates are generated based on keywords and weight coefficients of the keywords, and each set of the keywords provides a basic web page color scheme using a color scheme shift vector; and
   wherein the shift vector adjusts the web page color scheme on an element by element basis and adjusts a positioning of the elements on the web page based on the keywords and the weight coefficients.

2. The method of claim 1, further comprising creating a new web page template and adding it to the template library, if a desired by the user template is not found.

3. The method of claim 1, further comprising performing the usability assessment by an emulator executing user actions on the web page.

4. The method of claim 3, wherein the emulator tests the web page on different platforms.

5. The method of claim 1, wherein the web page templates reflect web site categories.

6. The method of claim 1, wherein the user can select web page color scheme.

7. The method of claim 1, wherein the user can insert video into the web page.

8. The method of claim 1, further comprising search optimization of the web page by GOOGLE™ web master tools.

9. The method of claim 1, wherein the user is given a choice of languages for the web page.

10. The method of claim 1, wherein the user is given a common template.

11. The method of claim 1, wherein the site builder application resides on the content server and is accessible to the client.

12. A system for implementing a web site builder, the system comprising:
 a processor;
 a memory; and
 a computer program logic stored in the memory and executed on the processor, the computer program logic for executing the steps of:
 generating a plurality of web page templates and storing them in a template library on a content server;
 establishing a network connection between the content server and a client;
 launching a site builder application on a client, the site builder application comprising a plurality of site builder wizards configured to receive and process site content data;
 acquiring the web page templates from the template library and rendering them to a user via a first site builder wizard;
 rendering to the user a web page design choices via a second site builder wizard;
 providing a third site builder wizard to a user for selecting a web page structure;
 presenting a user with a wizard for filling in a web page text and graphics;
 generating a preview of the web page and rendering it to the user;
 sending the web page to a specialist for a usability assessment; and
 publishing the web page upon completion of the usability assessment,
 wherein:
 the templates are generated based on keywords and weight coefficients of the keywords, and each set of the keywords provides a basic web page color scheme using a color scheme shift vector; and
 wherein the shift vector adjusts the web page color scheme on an element by element basis and adjusts a positioning of the elements on the web page based on the keywords and the weight coefficients.

* * * * *